United States Patent [19]

Miller

[11] Patent Number: 5,031,953

[45] Date of Patent: Jul. 16, 1991

[54] VISOR BRACKET

[75] Inventor: Douglas C. Miller, Hersey, Mich.

[73] Assignee: Plasta Fiber Industries, Inc., Marlette, Mich.

[21] Appl. No.: 539,345

[22] Filed: Jun. 18, 1990

[51] Int. Cl.$^5$ .................................................. B60J 3/00
[52] U.S. Cl. ....................................... 296/97.9; 403/13
[58] Field of Search ................... 296/97.1, 97.9, 97.13; 403/13, 14; 248/224.4, 223.4

[56] References Cited

U.S. PATENT DOCUMENTS

| | | | |
|---|---|---|---|
| 3,374,031 | 3/1968 | Dully | 296/97.13 |
| 4,525,008 | 6/1985 | Foggini | 296/97.13 |
| 4,690,450 | 9/1987 | Boerema | 296/97.9 |
| 4,696,510 | 9/1987 | Zwirner | 296/97.13 |
| 4,925,232 | 5/1990 | Hemmeke et al. | 296/97.9 X |

FOREIGN PATENT DOCUMENTS

| | | | |
|---|---|---|---|
| 2653988 | 6/1978 | Fed. Rep. of Germany | 296/97.9 |
| 3717094 | 12/1988 | Fed. Rep. of Germany | 296/97.13 |

Primary Examiner—Margaret A. Focarino
Assistant Examiner—Gary C. Hoge
Attorney, Agent, or Firm—Brooks & Kushman

[57] ABSTRACT

A visor bracket for use in a visor assembly includes at least one upwardly extending projection and the outer curved peripheral surface of a central boss which cooperate to prevent misalignment of the boss with a D-shaped opening formed in an inner sheet of the roof of a vehicle during installation of the visor assembly to the vehicle. Preferably, the outer curved peripheral surface is defined by the outer curved surface of a plurality of guide ribs which radially project from and extend around the periphery of the boss. The mounting bracket includes a mounting flange integrally formed with the boss and extending radially therefrom. The mounting flange includes a plurality of spaced mounting holes formed therethrough for alignment with attachment holes formed in the inner sheet of the roof of the vehicle. Preferably, two such projections are adapted to fit within the D-shaped opening at opposite ends of a straight line portion thereof. The guide ribs are formed on the boss opposite the projections and are aligned to fit within a curved portion of the D-shaped opening. Also, preferably the projections extend upwardly from ribs formed on the one side of the boss. Also, the top surface of the guide ribs is chamfered to facilitate insertion of the boss into the D-shaped opening.

11 Claims, 1 Drawing Sheet

VISOR BRACKET

TECHNICAL FIELD

The present invention relates to vehicle sun visors and, in particular, to mounting systems for installing a visor to a vehicle.

BACKGROUND ART

Vehicle visors are typically mounted on the headliner of a vehicle and secured to the underlying sheet metal roof by an elbow and bracket which permit the visor to be moved from a forward windshield position to the side window, depending upon driving conditions.

Plastic vehicle sun visor brackets, however, are often damaged during installation to vehicle roof sheet metal, due to misalignment caused in part by lack of installer awareness of proper position, especially if the sheet metal is covered by a considerable thickness of other materials, such as padding, spacers, shims, wiring and other headliner materials.

Plastic brackets also tend to have a larger central boss than die-cast metal brackets, allowing less clearance between the bracket boss and a matching hole in the inner roof sheet metal. This increases the likelihood of breakage caused by the bracket boss catching on the sheet metal during installation. Insertion and starting of mounting screws through the bracket mounting holes into matching holes in the roof inner sheet do not provide adequate alignment of the bracket boss with its matching hole in the roof inner sheet. This is due, in part, to looseness of tolerances between screw diameter and bracket mounting hole diameter and, in part, to installers who start mounting screws into the roof inner sheet at an oblique angle.

One prior art design is illustrated in FIG. 2 of the drawings. The bracket illustrated therein is made from die-cast metal and includes a relatively small central boss. Protrusions or prongs extend parallel to the axis of the central boss and are inserted in slots formed in the inner sheet metal roof for orientation and location of the bracket mounting holes. Because of its small size, the boss itself does not serve a locating function and is in no danger of catching on the sheet metal once the mounting screws are started.

Another prior art design is illustrated in FIG. 3 and is utilized with a D-shaped opening formed in the inner metal sheet of the roof. Such a design, however, fails to compensate for vehicle headliners having a substantial thickness and, consequently, the bracket is often damaged during installation, due to misalignment.

Other mounting mechanisms for vehicle sun visors generally of the type to which the present invention relates are disclosed in U.S. Pat. Nos. 4,529,157, 4,553,797, 4,818,013, 4,634,196, 4,352,518, 4,729,590 and 4,569,552.

SUMMARY OF THE INVENTION

An object of the present invention is to provide a sun visor mounting bracket which includes one or more projections from a boss which together with the boss allow a person installing the sun visor to a vehicle to sense when the boss is properly aligned with a mating opening in the sheet metal of the roof of the vehicle, wherein the sheet metal is recessed behind a headliner and other materials of considerable thickness.

Yet still another object of the present invention is to provide a sun visor mounting bracket, including one or more projections from a boss of the bracket which projection(s) not only aid in locating the bracket with respect to an inner sheet of the roof of the vehicle, but also prevent the boss from catching on the inner sheet when fasteners, such as screws, are utilized to tighten down the bracket with respect to the inner sheet. In other words, the projections serve to fend off the sheet metal as the bracket is torqued down against the inner sheet of the roof and wherein a curved outer surface of the boss preferably in the form of a plurality of ribs opposite the projection(s) also serve to fend off the sheet metal on the opposite side of the boss.

In carrying out the above objects and other objects of the present invention, there is provided a mounting bracket and a visor assembly for a vehicle having a roof headliner covering an inner sheet of the roof. The inner sheet has a D-shaped opening and a plurality of attachment holes radially spaced about the opening. The opening has a straight line portion and a curved portion. The ends of the straight line portion are coincident with the ends of the curved portion to form the D-shaped opening. The assembly includes a visor body, an L-shaped visor support rod received by the visor body, a mounting bracket and means for securing the support rod to the mounting bracket. The mounting bracket includes a mating D-shaped boss having a top surface and a curved outer peripheral surface to define the curved portion of the D-shaped boss. The boss also has a central axis and an aperture formed along the central axis and extending generally at right angles to the longitudinal axis of the support rod to receive the support rod therein. The mounting bracket also includes a mounting flange integrally formed with the boss and extending radially therefrom. The flange includes a like plurality of spaced mounting holes formed therethrough for alignment with the attachment holes formed in the inner sheet. The boss has at least one projection on one side of the boss extending above the top surface of the boss a distance at least equal to the thickness of the headliner. At least one projection is adapted to fit within the opening at one end of the straight line portion. The at least one projection and the curved outer peripheral surface of the boss cooperate to locate and prevent misalignment of the boss in the opening upon installation of the mounting bracket to the inner sheet of the roof through the headliner. Preferably, the boss has a plurality of radially projecting ribs including a plurality of guide ribs around the periphery of the boss to define the curved surface of the boss. The guide ribs are aligned to fit within the curved portion of the opening. The at least one projection and the guide ribs cooperate to prevent misalignment of the boss in the D-shaped hole upon installation of the mounting bracket to the inner sheet of the roof through the headliner.

Preferably, two ribs on the one side of the boss include upwardly extending projections adapted to fit within the opening at opposite ends of the straight line portion and wherein the projections extend generally parallel to the central axis of the boss.

Also, preferably, the top surface of each of the guide ribs is chamfered to facilitate insertion of the boss into the opening.

The advantages accruing to the use of a mounting bracket in a visor assembly constructed in accordance with the present invention are numerous. For example, the at least one projection allows a person installing sun visors in vehicles to sense when the boss of the bracket is in proper alignment with its mating opening in the sheet metal of the roof even when the sheet metal may be recessed behind a considerable thickness of space, padding, headliner material, spacers, shims, wiring and the like. In addition to providing increased sensing, the projection(s) and guide ribs eliminate bracket breakage by preventing the center boss from catching on the vehicle roof inner sheet metal when mounting screws are tightened. The length of the at least one protection is determined by the thickness of the materials and/or space covering the sheet material.

The objects, features and advantages of the present invention are readily apparent from the following detailed described o the best mode for carrying out the invention when taken in connection with the accompanying drawings.

BEST MODE FOR CARRYING OUT THE INVENTION

Figure 1:
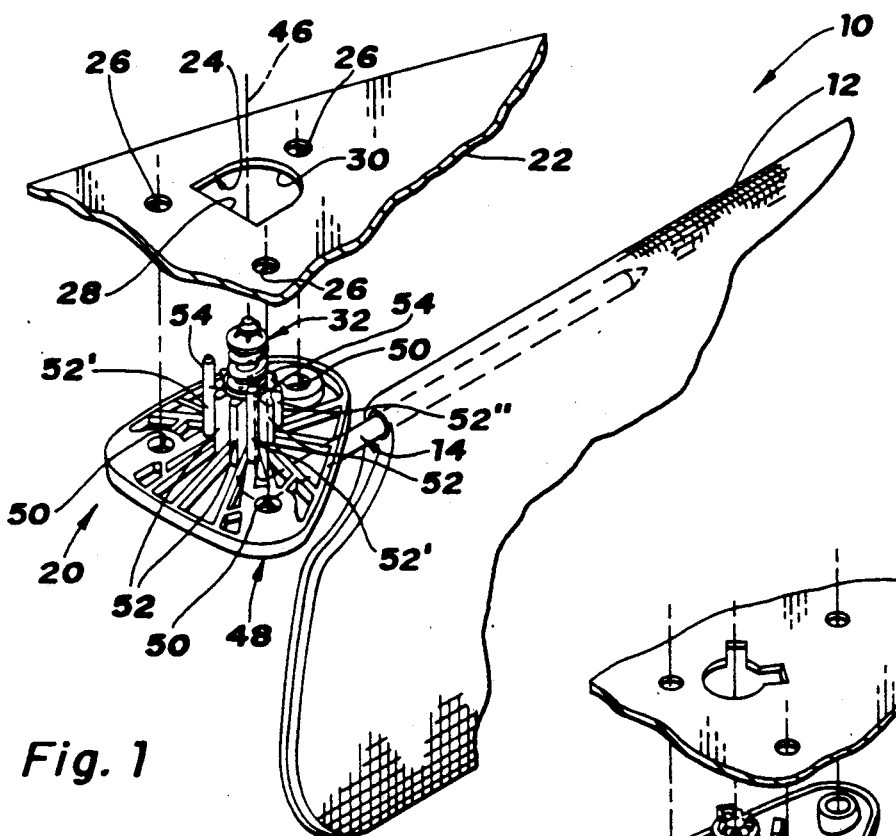
FIG. 1 is an environmental perspective view, partially broken away and in cross-section, of a visor assembly and an inner sheet of a roof of a vehicle including a mounting bracket constructed in accordance with the present invention.
Figure 2:
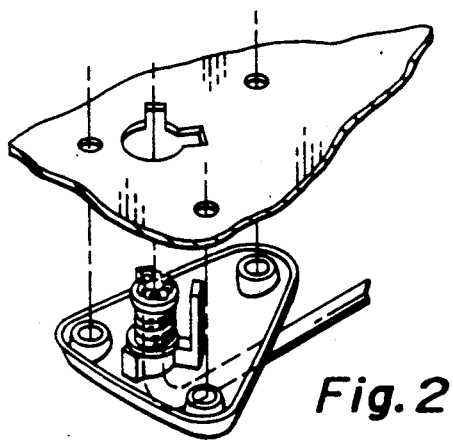
FIG. 2 is a view similar to FIG. 1, illustrating a prior art visor assembly and the inner sheet of the roof to which it is attached.
Figure 3:
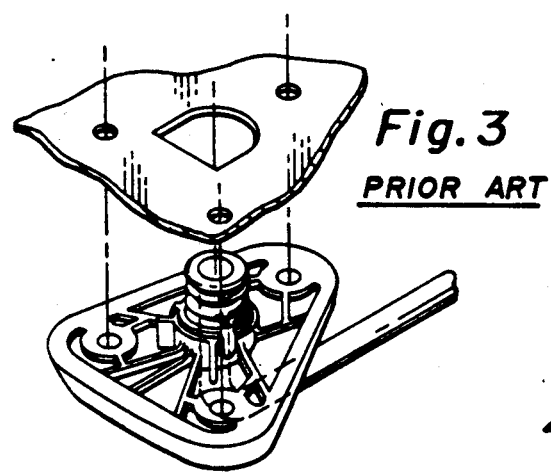
FIG. 3 is a view similar to FIG. 2, illustrating another prior art visor assembly and inner sheet of the roof to which it is attached.
Figure 4:
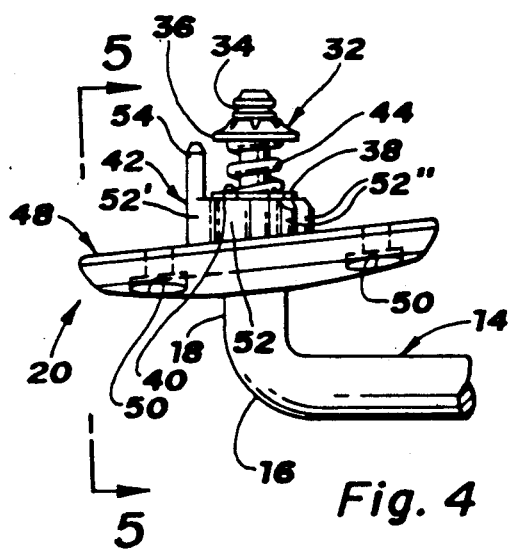
FIG. 4 is a side elevational view, partially broken away, of the visor assembly of FIG. 1.
Figure 5:
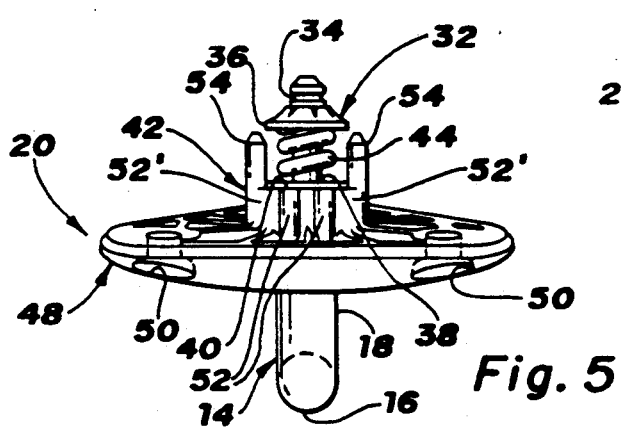
FIG. 5 is a front elevational view of the visor assembly of FIG. 4 taken along lines 5—5 of FIG. 4.

Referring now to drawing FIGS. 1, 4 and 5 there is illustrated a visor assembly, generally indicated at 10, embodying the present invention and which includes a visor or visor body 12, having an L-shaped visor pivot or support rod, generally indicated at 14, extending from one end thereof for securing the visor body 12 to the roof of a vehicle by the novel mounting structure of the present invention. The visor rod 14 includes an elbow 16 with an upper extending end 18 on which an integrally formed plastic mounting bracket, generally indicated at 20, is secured.

The mounting bracket 20 is provided for mounting the visor assembly 10 to an inner metal sheet 22 of a roof of a vehicle. The inner metal sheet 22 is typically covered by a headliner, the thickness of which is determined by the thickness of other materials and/or space covering the metal sheet 22.

The inner sheet 22 has a D-shaped opening, generally indicated at 24, and a plurality of attachment holes 26 radially spaced about the opening 24. The opening 24 includes a straight line portion 28 and a curved portion 30. The ends of the straight line portion 28 are coincident with the ends of the curved portion 30 to form the D-shaped opening 24.

The assembly 10 also includes a mechanism, generally indicated at 32, for resiliently securing the end 18 of the visor support rod 14 to a mounting bracket 20. In particular, the end 18 of the support 14 includes a plurality of interdental spaces 34 which permit linear movement of a pawl nut 36 in a downward direction and resist movement of the pawl nut 36 in an upward direction.

The mechanism 32 also includes a washer 38 which rests on the top surface 40 of a D-shaped boss, generally indicated at 42 of the bracket 20. Extending between the bottom surface of the pawl nut 36 and the top surface of the washer 38 about the end 18 of the support 14 is a compression spring 44 to resiliently secure the end 18 of a support rod 14 to the mounting bracket 20.

The boss 42 has a central axis 46 as illustrated in FIG. 1 and an aperture (not shown) formed along the central axis 46, generally at right angles to the longitudinal axis of the support rod 14 to receive the end 18 of the support rod 14 therein.

The mounting bracket 20 also includes a mounting portion, generally indicated at 48, integrally formed with the boss 42. The mounting portion 48 includes a like plurality of spaced mounting holes 50 formed through the mounting portion 48 for alignment with the attachment holes 26 formed in the inner sheet 22.

The boss 42 has a plurality of radially projecting ribs 52, 52' and 52" equally spaced about the outer periphery of the boss 42. On one side of the boss 42 a pair of projections or prongs 54 extend upwardly above the top surface 40 of the boss 42 on corner ribs 52', a distance at least equal to the thickness of the headliner which covers the inner sheet 22. The projections 52 are adapted to fit within the central opening 24 at opposite ends of the straight line portion 28.

Guide ribs 52" on the side of the boss 42 opposite the projections 54 are aligned to fit within the curved portion 30 of the opening 24.

The projections 54 and the guide ribs 52" cooperate to prevent misalignment of the attachment and mounting holes 26 and 50, respectively, and misalignment of the boss 42 and the opening 24 upon installation of the mounting bracket 20 to the inner sheet 22 of the roof through the vehicle headliner.

Alternatively, the ribs 52", 51' and 52 may be eliminated by using the boss 42 solid. Also, projections could be located at one or more locations above or on the curved portion of the boss 42 by downsizing the washer 38. Alternatively, the washer 38 itself could be formed with one or more upwardly extending projections.

As best shown in FIG. 4, the top surface of each of the three guide ribs 52" and consequently the top surface 40 of the boss 42 is chamfered to facilitate insertion of the boss 42 into the opening 24 and, in particular, to facilitate insertion of the boss 42 into the curved portion 30 of the opening 24 opposite the projections 54.

The projections 54 and the ribs 52, 52' and 52" all extend generally parallel to the central axis 46 of the boss 42. Each of the guide ribs 52" has an outer curved surface to fit within the curved portion 30 of the opening 24 in the inner sheet 22.

The advantages accruing to a visor assembly 10 incorporating the mounting bracket 20 of the present invention are numerous. For example, the projections 54 allow a person installing the sun visor assembly 10 in a vehicle to sense when the boss 42 of the bracket 20 is in proper alignment with its mating D-shaped opening 24 in the inner sheet 22 of the roof. This is especially advantageous when the inner sheet 22 is recessed behind a considerable thickness of space, padding, headliner material, spacer shims, wiring and the like. Often, these other materials are also formed with D-shaped openings which tend to give the installer of brackets of existing designs a false sense of alignment while mounting the bracket.

Another advantage lies in the function of the projections 54 acting in cooperation with guide ribs 52″ to automatically align, center, and guide the boss 42 through the opening 24 as the headliner and other spacing materials are compressed while mounting screws are being tightened. This feature prevents the boss 42 from catching on the inner sheet 22 of the roof, thereby preventing breakage of mounting bracket 20. The length of the projections 54 are determined by the thickness of the headliner and other materials or space covering the inner sheet 22 of the roof.

The invention has been described in an illustrative manner and, it is to be understood that, the terminology which has been used is intended to be in the nature of words of description rather than of limitation.

Obviously, many modifications and variations of the present invention are possible in light of the above teachings. It is, therefore, to be understood that, within the scope of the appended claims, the invention may be practiced otherwise than as specifically described.

What is claimed is:

1. In a visor assembly for a vehicle having a roof and a headliner covering an inner sheet of the roof, the inner sheet having a D-shaped opening and a plurality of attachment holes radially spaced about the opening, the opening having a straight line portion and a curved portion, the ends of the straight line portion being coincident with the ends of the curved portion to form the D-shaped opening, the assembly including a visor body, an L-shaped visor support rod received by the visor body, a mounting bracket, and means for securing the support rod to the mounting bracket and for allowing the visor body and support rod to pivot relative to the mounting bracket, the mounting bracket comprising:

a mating D-shaped boss having a top surface, and a curved outer peripheral surface to define the curved portion of the D-shaped boss, and a central axis, the boss receiving and supporting the support rod therein during pivoting of the visor assembly about the central axis; and a mounting flange integrally formed with the boss and extending radially therefrom, the mounting flange including a like plurality of spaced mounting holes formed therethrough for alignment with the attachment holes formed in the inner sheet, at least one vertical projection extending upwardly from one side of the top surface of the boss a distance at least equal to the thickness of the headliner, the at least one projection fitting within the opening at one end of the straight line portion of the opening, the at least one projection and the curved outer peripheral surface of the boss cooperating to allow a person installing the visor assembly to sense when the boss of the bracket is properly aligned with the opening and to prevent misalignment of the boss in the opening upon installation of the mounting bracket to the inner sheet of the roof through the headliner wherein both the at least one projection and the curved outer peripheral surface of the boss fend off the sheet metal during installation and prevent the boss from catching on the inner sheet and thereby prevent breakage of the bracket.

2. The invention as claimed in claim 1 wherein the boss has a plurality of radially projecting guide ribs around the periphery of the boss to define the curved surface of the boss, the guide ribs being aligned to fit within the curved portion of the opening and cooperating with the at least one projection to prevent misalignment.

3. The invention as claimed in claim 2 wherein the top surface of each of the guide ribs is chamfered to facilitate insertion of the boss into the opening.

4. The invention as claimed in claim 2 wherein the at least one projection and the guide ribs extend generally parallel to the central axis of the boss.

5. The invention as claimed in claim 2 wherein each of the guide ribs has an outer curved surface to fit within the curved portion of the opening of the inner sheet.

6. The invention as claimed in claim 2 wherein said means for securing resiliently secures one end of the support rod to the mounting bracket at the top surface of the boss.

7. The invention as claimed in claim 2 wherein the ribs are generally equally spaced about the boss.

8. The invention as claimed in claims 2, 3, 4, 5, 6, or 7 wherein two ribs on one side of the boss include upwardly extending projections adapted to fit within the opening at opposite ends of the straight line portions, the projections extending parallel to the central axis of the boss.

9. The invention as claimed in claim 8 wherein the bracket is integrally formed from plastic.

10. The invention as claimed in claim 1 wherein the top surface of the boss is chamfered to facilitate insertion of the boss into the opening.

11. In a visor assembly for a vehicle having a roof and a headliner covering an inner sheet of the roof, the inner sheet having a D-shaped opening and a plurality of attachment holes radially spaced about the opening, the opening having a straight line portion and a curved portion, the ends of the straight line portion being coincident with the ends of the curved portion to form the D-shaped opening, the assembly including a visor body, an L-shaped visor support rod received by the visor body, a plastic integrally formed mounting bracket, and means for resiliently securing one end of the support rod to the mounting bracket and for allowing the visor body and the support rod to pivot relative to the mounting bracket, the mounting bracket comprising:

a boss having a top surface, and a central axis the boss receiving and retaining the support rod therein during pivoting of the visor assembly about the central axis; and a mounting flange integrally formed with the boss and extending radially therefrom, the mounting flange including a like plurality of spaced mounting holes formed therethrough for alignment with the attachment holes formed in the inner sheet, the boss having a plurality of radially projecting, generally equally spaced ribs about the boss and wherein two ribs on one side of the boss include upwardly extending vertical projections, the projections extending parallel to the central axis of the boss upwardly from one side of the top surface of the boss a distance at least equal to the thickness of the headliner, the two projections fitting within the opening at opposite ends of the straight line portion, the ribs including a plurality of guide ribs on the opposite side of the boss aligned to fit within the curved portion of the opening, wherein the top surface of each of the guide ribs is chamfered to facilitate insertion of the boss into the opening and wherein each of the guide ribs has an outer curved surface to fit within the curved portion of the opening of the inner sheet, the two projections and the guide ribs cooperating to allow a person installing the visor assembly to sense when the boss of the bracket is properly aligned with the opening to locate and to prevent misalignment of the attachment and mounting holes and misalignment of the boss and the opening upon installation of the mounting bracket to the inner sheet of the roof through the headliner wherein the projections and the guide ribs fend off the sheet metal during installation and prevent the boss from catching on the inner sheet and thereby prevent breakage of the bracket.

* * * * *